United States Patent [19]

Clark

[11] 4,375,929
[45] Mar. 8, 1983

[54] PROTECTIVE FLOOD BARRIER

[76] Inventor: Travis B. Clark, P.O. Box 218, Walker, La. 70785

[21] Appl. No.: 183,440

[22] Filed: Sep. 2, 1980

[51] Int. Cl.³ .......................... E02B 7/02; E02D 31/00
[52] U.S. Cl. ................................... 405/114; 52/169.14
[58] Field of Search ............... 405/60, 70, 72, 107, 405/114, 115; 49/70; 52/102, 169.7, 169.12, 169.14, DIG. 3

[56] References Cited

U.S. PATENT DOCUMENTS

| | | | |
|---|---|---|---|
| 1,814,509 | 7/1931 | Gröner | 405/115 X |
| 2,145,284 | 1/1939 | Anderson et al. | 52/169.14 |
| 3,218,810 | 11/1965 | Grether et al. | 405/107 |
| 3,499,290 | 3/1970 | Smith | 405/72 |
| 3,722,156 | 3/1973 | Bryant | 52/169.12 |
| 3,861,081 | 1/1975 | Maskell | 49/70 |
| 4,020,509 | 5/1977 | West | 52/169.7 |
| 4,136,995 | 1/1979 | Fish | 405/115 |
| 4,252,461 | 2/1981 | Colamussi et al. | 405/115 |

FOREIGN PATENT DOCUMENTS

| | | | |
|---|---|---|---|
| 516051 | 1/1972 | Switzerland | 52/169.14 |
| 2037350 | 7/1980 | United Kingdom | 405/115 |

*Primary Examiner*—David H. Corbin
*Attorney, Agent, or Firm*—Roy, Kiesel, Patterson & McKay

[57] ABSTRACT

A protective flood barrier comprising panels sealingly attachable to one another to form a continuous barrier around a building structure and sealingly attachable to a fixed foundation surrounding the structure.

10 Claims, 6 Drawing Figures

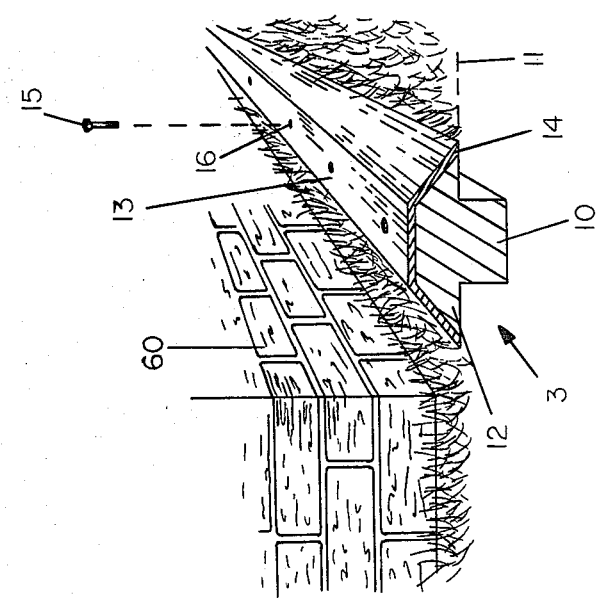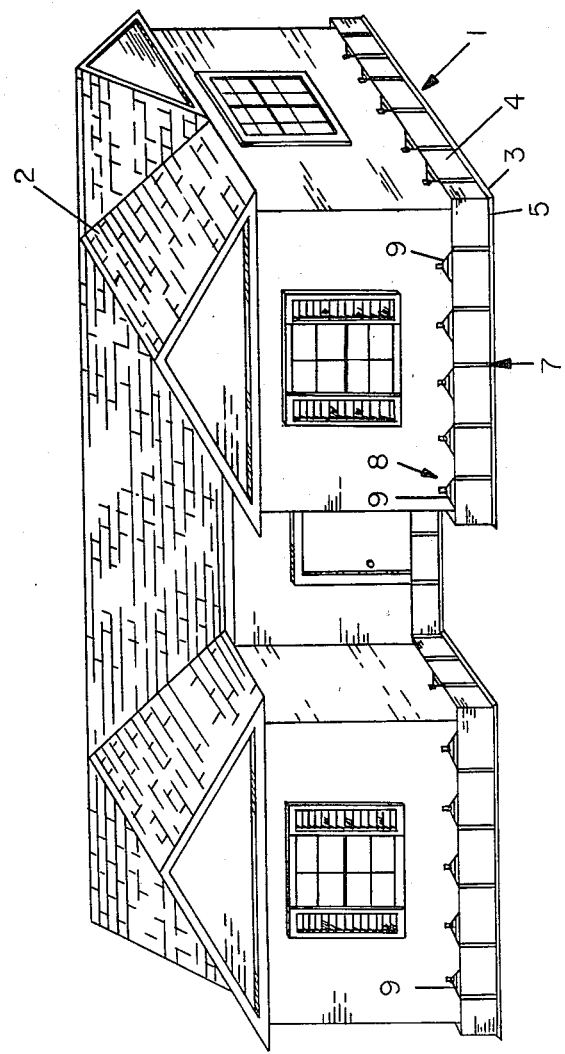

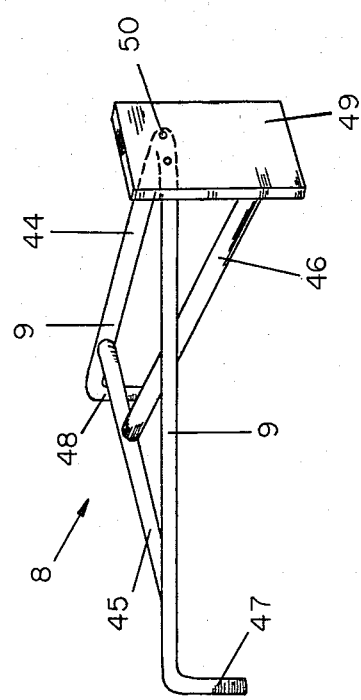
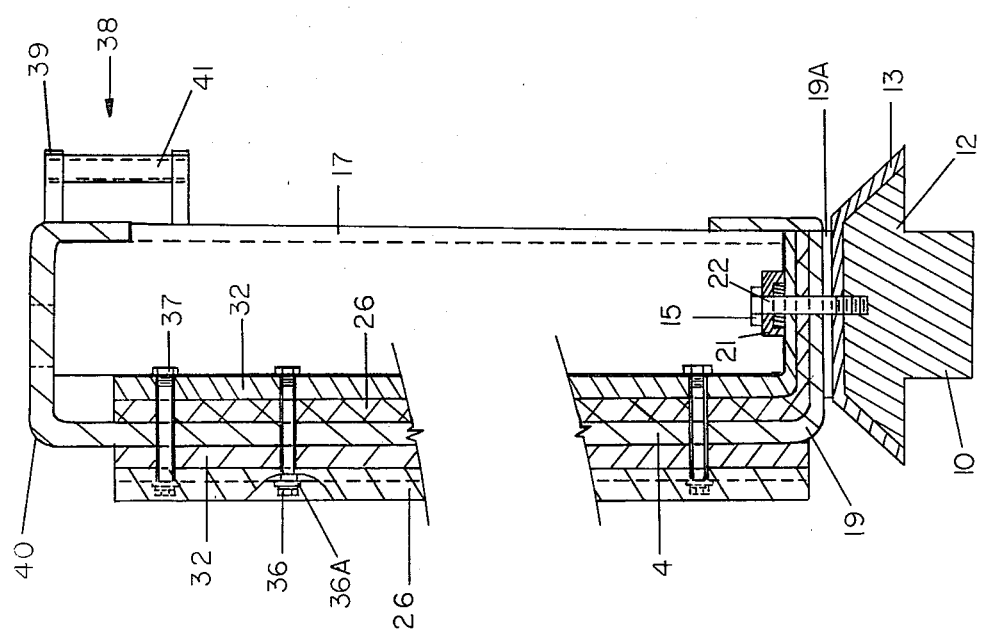

PROTECTIVE FLOOD BARRIER

BACKGROUND OF INVENTION

1. Field of the Invention

This invention relates generally to dams, and more particularly to removable dam structures used to protect homes and similar building structures during periods of flooding.

2. Prior Art

Flooding in low lying areas has long been a problem resulting today in damage to homes and other buildings and equipment in the tens of millions of dollars. Because of this long standing constant problem, many protective flood barriers have been designed. Examples of such designs are seen in the following patents:

| U.S. Pat. No. | 303128 | A. Dean | 8/5/1884 | Portable Breakwater |
| U.S. Pat. No. | 419093 | S. P. Williams | 1/7/1890 | Portable Dam |
| U.S. Pat. No. | 830437 | J. W. Humphrey | 9/4/06 | Fence or Dike |
| U.S. Pat. No. | 972059 | T. C. Clarke | 10/4/10 | Temporary Wall |
| U.S. Pat. No. | 3172267 | F. F. Fisher | 1/30/61 | Portable Protective Flood Barrier |
| U.S. Pat. No. | 3342033 | R. L. Crouch | 4/8/65 | Method of Providing a sealed Joint Employing a Flexible Bag |

Despite the many prior art attempts there remains a need for a protective flood barrier that can be easily and quickly installed, has better sealing characteristics, is light in weight but has strong structural characteristics, which can be stored in a minimum space when not in use, and which is designed to allow for flexibility in shape design.

SUMMARY OF THE INVENTION

Therefore, it is an object of this invention to provide a protective flood barrier which will protect homes and other similar structures from flood waters.

Another object of this invention is to provide a protective flood barrier that can be easily and quickly installed.

A further object of this invention is to provide a protective flood barrier that is light in weight but has strong structural characteristics.

A further object of this invention is to provide a protective flood barrier which can be stored in minimum space when not in use and which is designed to allow flexibility in shape design.

Still another object of this invention is to provide an easily installable protective flood barrier having good sealing characteristics.

Other objects and advantages of this invention will become apparent from the ensuing descriptions of the invention.

Accordingly, a protective flood barrier to protect a building from flood waters comprising a continuous water-tight fixed foundation positioned in close proximity to the building; panel members sealingly attachable at their lower end to the foundation and abuttingly positioned at their vertical edges adjacent one another; sealing assemblies comprising first and second gasket strips positionable across and on opposite sides of the abutting vertical edges, first and second plates positionable across and exteriorly of the first and second gasket strips, respectively, the plates and gasket strips sealingly attachable to the abutting adjacent panels by attaching means; and a support means attachable to the panels and having arm members abutting against the building.

BRIEF DESCRIPTION OF THE DRAWINGS

FIG. 1 is a three-dimensional view of an assembled protective flood barrier of this invention about a residential home.

FIG. 2 is a cutaway showing the permanent foundation on which the portable sealable panels shall be attached.

FIG. 5 is a cross-sectional view of the flexible panels mounted on the fixed foundation.

FIG. 6 is a three-dimensional view of the support assembly attachable to the flood barrier panels and which abuts against the building structure to be protected.

PREFERRED EMBODIMENTS OF THE INVENTION

Figure 4:
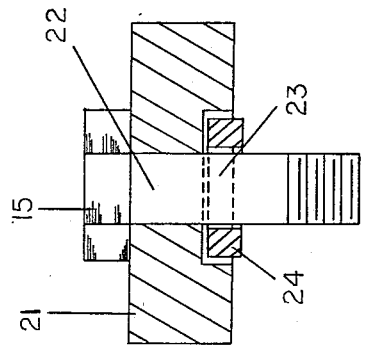
FIG. 4 is a partial cross-sectional end view of bar member used for attaching adjoining panels.

Many residential and commercial buildings are constantly threatened with rising flood waters which occur during heavy, rainy periods and unless protected against the rising water these structures incur substantial damages. Normally, these locations will have one or more days' advance notice of the impending flooding and therefore turning now to FIG. 1, a protective flood barrier, denoted generally by the numeral 1 is illustrated positioned in close proximity to house 2, panel members 4 sealing attachable at their lower end 5 to foundation 3 and are abuttingly positioned at their vertical edges 6 adjacent one another as shown, sealing assemblies, denoted generally by the numeral 7 are attached to the adjacent abutting panels in a sealing manner, and support means 8 attachable to the panels and having arm members 9 abutting against house 2.

Turning now to FIG. 2, foundation 3 is preferably constructed from concrete or other similar materials and has a concrete slab 10 extending below ground level 11 and is further provided with a shoulder section 12 extending slightly above ground level with a foundation top plate 13 fitting over and attachable to shoulder section 12. In a more preferred embodiment, shoulder section 12 is provided with a sloped edge 14 facing away from building wall 60 of house 2 most preferably foundation top plate 13 is constructed from a rust resistant material such as stainless steel or hard plastic material. Further, it is preferred that shoulder section 12 extend only slightly above the ground level so as not to interfere with grass cutting or other such lawn operations. Finally, it is preferred that plate 13 be attached to shoulder 12 by means of alloy bolts 15 that are threaded through gasket openings 16 into shoulder section 12. These bolts can remain in position when the protective barrier 1 is not being used and are removable when the panels 4 4 are to be attached as described hereinbelow.

Figure 3:
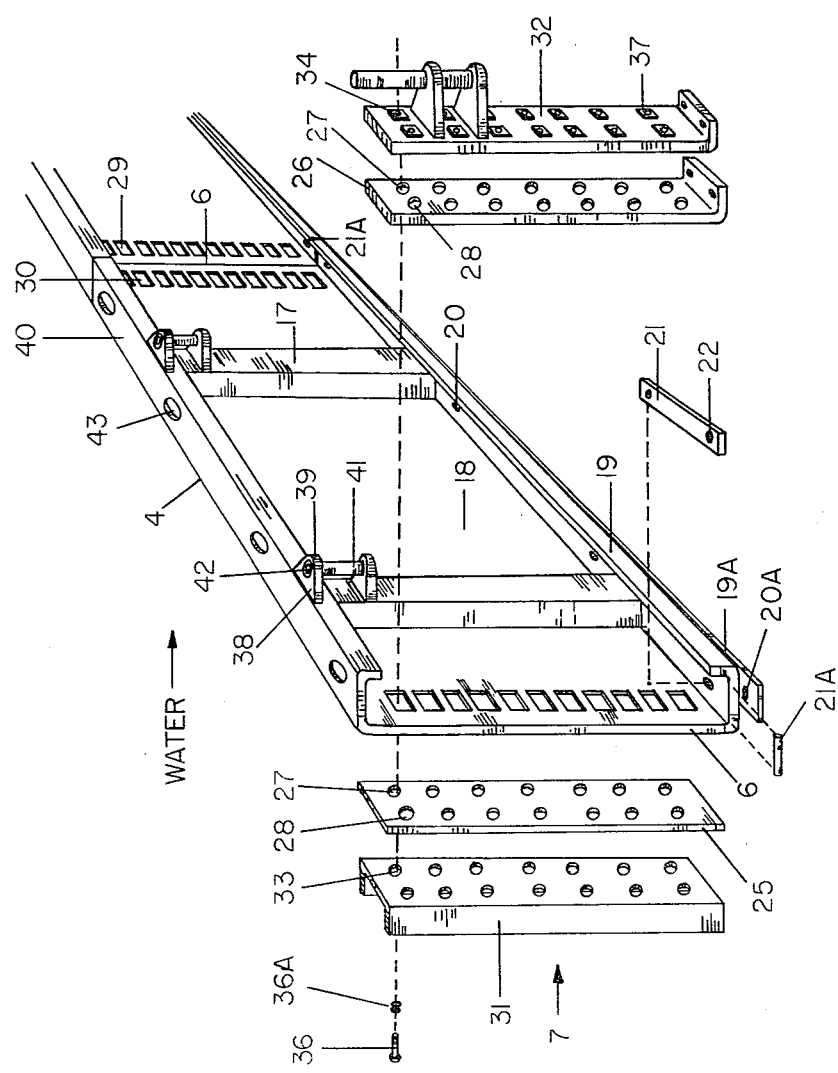
FIG. 3 is an exploded three-dimensional view of two protective joining panels and the sealing mechanisams therewith.

Referring to FIG. 3, panels 4 are preferably constructed from light gauge galvanized sheet metal or ridged plastic or fiberglass in order to reduce the weight of panels 4. It is also more preferred that panels 4 be constructed of noncorrosive and rust resistant materials. To add increased structural support to panels 4, vertical rib members 17 constructed from U-shaped metal pieces are fixedly attached to panel surface 18 as shown. The number of rib members will depend upon the height and width and material in which panels 4 are constructed. In a preferred embodiment, each panel is provided with a lower U-shaped lip section 19 having openings 20 alignable with openings 16 of top plate 13. In a more preferred embodiment, to insure proper sealing gasket 19A is fixedly attached to the bottom surface of end portion 19 and having openings 20A aligned with openings 20. In a more preferred embodiment bar member 21 is positioned at the intersection of adjacent panels 4 in the trough formed by the U of lower end portion 19 and is provided with openings 22 (see FIG. 4) and a recessed cavity 23 into which gasket 24 is placed. In a still more preferred embodiment, round rubber gasket 21A is placed between adjacent panels 4 below the trough formed by low end portion 19 and is held in position when bar 21 is attached as described below. Openings 22 are positioned to align with openings 20 so that bolt 15 passes through opening 22 past gasket 24, opening 20 and threaded into foundation gasket opening 16 and into foundation shoulder section 12 to form a water-tight seal between top plate 13 and the gasketed bottom of lower end portion 19.

To seal the abutting edges 6 of panels 4 sealing assemblies comprising first and second gasket strips 25 and 26, respectively, each have parallel rows of aligned openings 27 and 28, respectively, which in themselves are alignable with rows of openings 29 and 30 of abutting panels 4. Sealing assembly also comprises first and second plates 31 and 32 which are positionable over gasket strips 25 and 26, and more preferably fixedly attached thereto, respectively and which are also provided with parallel rows of alignable openings 33 and 34, respectively. These plates and gaskets sandwich panels 4 and are sealingly attached by bolts 36 having gasketed washers 36A. Bolts 36 with washers 36A pass through the aligned openings and are in a preferred embodiment threaded into nuts 37 preferably already fixedly attached to the outer surface of plate 32 as shown.

In another preferred embodiment, sleeve assemblies 38 comprising gusset plates 39 attached to the upper portion of rib member 17 and plate 32, securing sleeve 41 in a vertical position having passageway 42 to receive arm members 9 as described hereinbelow.

Gusset plates 39 and sleeve 41 are preferably shaped to allow the top of sleeves 41 to be positioned at the same height and equally distanced from panel 4.

Top U-shaped section 40 is preferably provided with openings 43 which would allow stacking a second horizontal layer of panels to increase the height of the protective flood barrier if desired. These panels would then also be bolted together and provided with a gasket inbetween for sufficient water-tight sealing.

Turning now to FIG. 6, support means 8 is preferably constructed of hollow tubular pieces 44, 45 and 46 wherein piece 44 is curved to form arm members 9 having turned down stub sections 47 and 48, respectively, which fit into passageway 42 of sleeve member 41. Piece 45 extends between the curved section of arm members 9 to provide structural support. In a more preferred embodiment, arm members 9 are perpendicular to curved downward positions 47 and 48 to allow piece 46 attached at one end to cross member 45 and at its other end to plate 49 which is supported at its top end by the curved end 50 of arm member 9. Plate 49 will preferably abut against building wall 60 as shown in FIG. 1 in order to spread the force of the flood water against the dam structure.

There are, of course, many other obvious alternative embodiments of this invention not specifically mentioned, but which are intended to fall within the scope of the invention as defined by the following claims.

What I claim is:

1. A protective flood barrier to protect a building from flood waters which comprises:
   (a) a continuous, water-tight, foundation positioned in close proximity to said building;
   (b) rigid panal members sealingly attachable to their lower end to said foundation with sealing material between said panel members and said foundation, and with said panel members being abuttingly positioned at their vertical edges adjacent one another;
   (c) sealingly assemblies comprising:
      (i) first and second gasket strips positionable across and on opposite sides of said abutting vertical edges,
      (ii) first and second plates positionable across and exteriorly of said first and second gasket strips, respectively, said plates and gasket strips sealingly attachable to said abutting adjacent panels by attaching means; and,
   (d) support means attachable to said panels and having an arm member abutting against said building.

2. A protective flood barrier according to claim 1 wherein said foundation comprises:
   (a) a concrete slab extending below ground level and having shoulder section extending above ground level, and
   (b) a top plate fitting over and attachable to said shoulder section.

3. A protective flood barrier according to claim 2 wherein said shoulder section comprises a sloped edge facing away from said building.

4. A protective flood barrier according to claim 2 wherein said top plate is constructed from stainless steel.

5. A protective flood barrier according to claim 1 wherein said panel members have vertical rib members for increasing the structural strength of said panel members.

6. A protective flood barrier according to claim 1 wherein said vertical adjacent panel edges having corresponding aligned openings of sufficient size to allow bolts to pass therethrough.

7. A protective flood barrier according to claim 6 wherein said second plate has parallel rows of nuts fixedly attached in positions alignable with said openings.

8. A protective flood barrier according to claim 1 wherein sleeve assemblies having vertical channels are attached to the upper portion of said panels to receive the ends of said arm members.

9. A protective flood barrier according to claim 1 wherein said panels are constructed from rust resistant materials.

10. A protective flood barrier according to claim 1 wherein said support means has a flat contact plate attached to the end of said arm member for abutting against said building.

* * * * *